United States Patent
Joyce

(10) Patent No.: US 12,196,851 B2
(45) Date of Patent: Jan. 14, 2025

(54) DISPLAYING WEATHER INFORMATION CORRESPONDING TO A SELECTED REGION

(71) Applicant: Honeywell International Inc., Charlotte, NC (US)

(72) Inventor: James W Joyce, Olathe, KS (US)

(73) Assignee: Honeywell International Inc., Charlotte, NC (US)

( * ) Notice: Subject to any disclaimer, the term of this patent is extended or adjusted under 35 U.S.C. 154(b) by 200 days.

(21) Appl. No.: 17/812,348

(22) Filed: Jul. 13, 2022

(65) Prior Publication Data

US 2024/0019572 A1  Jan. 18, 2024

(51) Int. Cl.
*G01S 13/95* (2006.01)
*B64D 45/00* (2006.01)

(52) U.S. Cl.
CPC ............ *G01S 13/953* (2013.01); *B64D 45/00* (2013.01)

(58) Field of Classification Search
CPC .................................................... G01S 13/953
See application file for complete search history.

(56) References Cited

U.S. PATENT DOCUMENTS

| | | | |
|---|---|---|---|
| 6,473,003 B2 | 10/2002 | Horvath et al. | |
| 7,747,360 B2 | 6/2010 | Canu-Chiesa et al. | |
| 8,830,090 B2 | 9/2014 | Shafaat | |
| 9,057,773 B1 * | 6/2015 | Fersdahl | G01S 13/953 |
| 9,157,750 B2 | 10/2015 | Miichi et al. | |
| 9,411,044 B1 | 8/2016 | Sperling et al. | |
| 9,437,112 B1 | 9/2016 | Greene | |
| 9,459,716 B2 | 10/2016 | Miichi | |
| 9,727,220 B2 | 8/2017 | Matsumoto et al. | |
| 9,753,623 B2 | 9/2017 | Asahara | |
| 9,810,770 B1 * | 11/2017 | Weichbrod | G01S 7/10 |
| 9,869,766 B1 | 1/2018 | Breiholz et al. | |

(Continued)

FOREIGN PATENT DOCUMENTS

EP  3293553 A1  3/2018
EP  3862786 A1  8/2021

OTHER PUBLICATIONS

Response to Extended Search Report dated Sep. 21, 2023, from counterpart European Application No. 23182005.1, filed Feb. 27, 2024, 17 pp.

(Continued)

*Primary Examiner* — Travis R Hunnings
(74) *Attorney, Agent, or Firm* — Shumaker & Sieffert, P.A.

(57) ABSTRACT

A computing system may mount on an ownship vehicle. The computing system may include a memory configured to store three-dimensional radar data indicating weather proximate to the ownship vehicle; a touchscreen; and processing circuitry. The processing circuitry is configured to output, for display by the touchscreen, a two-dimensional overhead profile of the weather proximate to the ownship vehicle; receive, from the touchscreen, an indication of a selected region of the weather proximate to the ownship vehicle; determine, based on the three-dimensional radar data, additional information corresponding to the selected region of the weather; and output, for display by the touchscreen, the two-dimensional overhead profile of the weather overlaid with an indication of the additional information about the selected region.

18 Claims, 12 Drawing Sheets

(56) References Cited

U.S. PATENT DOCUMENTS

| | | | |
|---|---|---|---|
| 9,891,728 B2 | 2/2018 | Okubo et al. | |
| 9,958,573 B2 | 5/2018 | Stulken et al. | |
| 10,037,124 B2 | 7/2018 | Khatwa et al. | |
| 11,790,788 B2 * | 10/2023 | Tanaka | B64D 27/24 340/971 |
| 2002/0128755 A1 | 9/2002 | Horvath et al. | |
| 2015/0338237 A1 * | 11/2015 | Bonamy | G01C 23/005 340/973 |
| 2020/0319335 A1 | 10/2020 | Cornell et al. | |
| 2020/0386884 A1 | 12/2020 | Dillard et al. | |
| 2020/0393563 A1 | 12/2020 | Songa et al. | |

OTHER PUBLICATIONS

Extended Search Report from counterpart European Application No. 23182005.1 dated Sep. 21, 2023, 8 pp.

Communication pursuant to Article 94(3) EPC from counterpart European Application No. 23182005.1 dated Jun. 17, 2024, 5 pp.

Response to Communication pursuant to Article 94(3) EPC dated Jun. 17, 2024, from counterpart European Application No. 23182005.1 filed Oct. 15, 2024, 17 pp.

* cited by examiner

DISPLAYING WEATHER INFORMATION CORRESPONDING TO A SELECTED REGION

TECHNICAL FIELD

This disclosure relates to weather radar systems.

BACKGROUND

An aircraft may use an onboard weather radar system to detect adverse weather conditions, which may enable the flight crew to make changes to the flight plan as necessary to avoid potentially hazardous weather. The onboard weather radar system may be mounted on the aircraft and may use radar scans to detect reflected radar signals from weather formations such as convective weather cells associated with turbulence, rain, lightning, and hail. Up-to-date weather information may assist the flight crew of the aircraft in evaluating whether or how to modify a flight plan to ensure safety of the flight, as well as to promote fuel efficiency, time efficiency, and passenger comfort.

The onboard weather radar system may control weather radar scanning and may process radar return signals to present a visual weather radar display. An aircraft in flight may also receive weather data from other sources such as ground-based weather radar stations, which may help identify convective weather regions or other emerging hazards for aircraft operations. Aircraft operators and flight crews may thus be able to evaluate hazardous areas and to potential changes in heading or flight altitude in response.

SUMMARY

In general, this disclosure is directed to methods, techniques, devices, and systems for displaying information on a user interface of a navigation system onboard a vehicle. In some examples, the vehicle is an aircraft (e.g., an ownship). For example, the screen of the navigation system may display weather information. The weather information may be displayed as an overhead perspective view, an overhead cross-sectional view, a vertical cross-sectional view, a vertical perspective view, or any combination thereof. In some examples, the navigation screen may receive one or more requests to display additional information corresponding to a selected area of the overhead cross-sectional view. For example, the user interface may receive a touch input selecting an area of the overhead view of the weather. The navigation system may display additional information corresponding to the selected area in response to receiving the user selection.

It may be beneficial, in some cases, to display an overhead view of weather near a vehicle so that users may plot a path through and/or around the weather. The navigation system may allow a user to input a proposed flight path overlaid on the overhead view of the weather. Since the screen displays a weather profile ahead of the vehicle, the user may input the proposed flight path to circumvent, traverse, or otherwise get through potentially hazardous areas of weather. The navigation system may store three-dimensional weather data including radar data collected by one or more radar devices onboard the vehicle. The navigation system may generate a vertical side profile of the weather corresponding to the proposed flight path input to the user interface. The navigation system may output the vertical side profile for display by the user interface. In aircraft cockpits, flight crew sometimes process lots of information and experience high workload conditions. This means that a navigation system with more abilities to control information displayed are useful and beneficial. Techniques for providing user control of information displayed by the screen may be beneficial for allowing flight crew to select information for display.

In some examples, a computing system is configured to mount on an ownship vehicle, the computing system comprising: a memory configured to store three-dimensional radar data indicating weather proximate to the ownship vehicle; a touchscreen; and processing circuitry. The processing circuitry is configured to output, for display by the touchscreen, a two-dimensional overhead profile of the weather proximate to the ownship vehicle; receive, from the touchscreen, an indication of a selected region of the weather proximate to the ownship vehicle; determine, based on the three-dimensional radar data, additional information corresponding to the selected region of the weather; and output, for display by the touchscreen, the two-dimensional overhead profile of the weather overlaid with an indication of the additional.

In some examples, a method includes outputting, by processing circuitry for display by a touchscreen, a two-dimensional overhead profile of the weather proximate to an ownship vehicle; receiving, by the processing circuitry from the touchscreen, an indication of a selected region of the weather proximate to the ownship vehicle; determining, by the processing circuitry based on three-dimensional radar data stored in a memory, additional information corresponding to the selected region of the weather, the three-dimensional radar data indicating weather proximate to the ownship vehicle; and outputting, by the processing circuitry for display by the touchscreen, the two-dimensional overhead profile of the weather overlaid with an indication of the additional information about the selected region.

In some examples, a non-transitory computer-readable medium includes instructions for causing one or more processors to: output, for display by a touchscreen, a two-dimensional overhead profile of the weather proximate to an ownship vehicle; receive, from the touchscreen, an indication of a selected region of the weather proximate to the ownship vehicle; determine, based on three-dimensional radar data stored in a memory, additional information corresponding to the selected region of the weather, the three-dimensional radar data indicating weather proximate to the ownship vehicle; and output, for display by the touchscreen, the two-dimensional overhead profile of the weather overlaid with an indication of the additional information about the selected region.

The details of one or more examples are set forth in the accompanying drawings and the description below. Other features, objects, and advantages will be apparent from the description and drawings, and from the claims.

DETAILED DESCRIPTION

Figure 1:
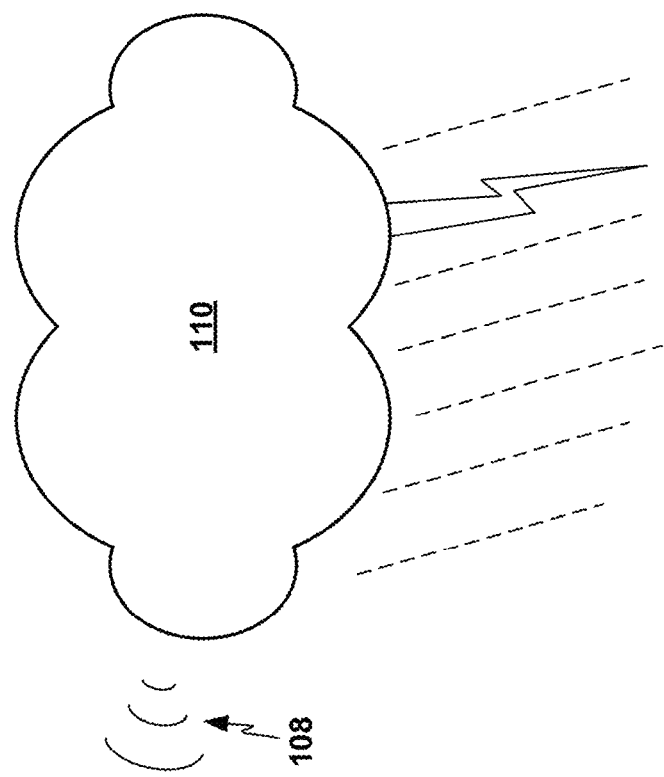
FIG. 1 depicts a conceptual diagram of a vehicle equipped with an example weather avoidance system, in accordance with one or more techniques of this disclosure.
Figure 1:
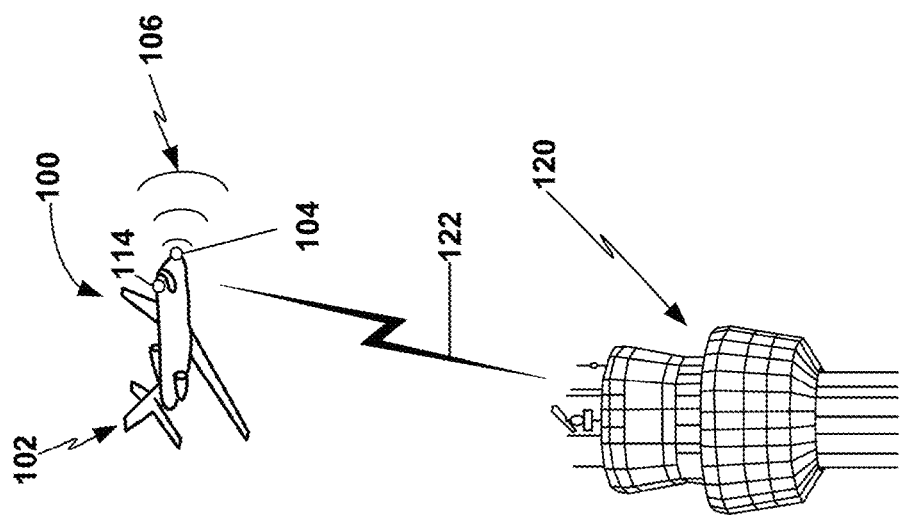

FIG. 1 depicts a conceptual diagram of a vehicle 102 equipped with an example weather-avoidance system 100, in accordance with one or more techniques of this disclosure. In the example depicted in FIG. 1, vehicle 102 is depicted as aircraft 102, however, the techniques of this disclosure may similarly be applicable to any other air vehicle, such as a helicopter or unmanned aerial vehicle (UAV).

In this example, weather-avoidance system installed in aircraft 102 includes at least an onboard weather radar system 104 and a vehicle navigation system 114. Weather radar system 104 and vehicle navigation system 114 may be integrated into a single coherent unit, or alternatively, may be two physically distinct units in data communication with one another.

Onboard weather radar system 104 performs and processes weather radar scans. For example, weather radar system 104 may include at least a transmitter configured to emit a transmitted radar signal 106 and a receiver configured to detect a reflected radar signal 108. As described further with respect to FIG. 2 below, onboard weather radar system 104 may include processing circuitry configured to identify, based on reflected signal 108, one or more obstacles surrounding aircraft 102, and output an indication of the obstacle(s) for display to a user, such as a pilot of aircraft 102. For example, as shown in FIG. 1, weather radar system 104 may be configured to detect, based on reflected radar signal 108, an instance of inclement weather 110 within a current intended flight path of aircraft 102. For example, inclement weather 110 may generally include any hazardous atmospheric disturbance, such as a storm cell, storm clouds, hail, rain, tornadoes, hurricanes, and blizzards. Onboard weather radar system 104 may identify one or more areas of potential headwinds and/or turbulence based on radar data corresponding to weather 110.

In some examples in accordance with this disclosure, weather radar system 104 may be configured to determine, based on a reflected radar signal, an area of inclement weather in the travel path of the vehicle and output information indicative of the inclement weather. For example, weather radar system 104 may detect upcoming inclement weather 110 and output information indicative of characteristics of the weather 110, allowing flight crew to select another flight path to avoid the inclement weather 110. For example, weather radar system 104 may be configured to output information indicative of one or more factors relating to the inclement weather 110, such as, but not limited to, a speed and/or direction of motion, a current or future proximity to aircraft 102, a size and/or shape, a relative severity, and a general nature, such as whether the weather is or will be discharging precipitation, snow, hail, lightning, tornadoes, or other detritus toward the ground.

In some examples, radar system 104 may receive information indicative of a user input of a flight path that avoids inclement weather 110, for example, by changing a horizontal direction of travel in order to circumvent weather 110 while maintaining a constant altitude. In some examples, the flight path may include a vertical change in altitude in order to either "jump over" or "crawl under" the inclement weather 110. As previously discussed, because inclement weather 110 may be releasing one or more of rain, snow, hail, lightning, or tornadoes downward toward the ground, flight crew may more often determine that an upward climb in altitude to "jump over" the storm 110 is preferable to a downward drop in altitude for the comfort and/or safety of the vehicle's occupants.

In some examples, vehicle navigation system 114 may be configured to store three-dimensional radar data in a memory. In some examples, the three-dimensional radar data may include radar data corresponding to the reflected radar signals 108 from weather 110. Three-dimensional weather data may include data for one or more points within a three-dimensional Cartesian space. Vehicle navigation system 114 may update the three-dimensional radar data stored in the memory based on the most recent data arriving at aircraft 102, so that the three-dimensional radar data reflects the current state of weather 110. Vehicle navigation system 114 may, in some examples, output at least some of the three-dimensional radar data for display on a user interface (e.g., a touchscreen) so that users can view the data. In some examples, the user interface may receive one or more inputs based on the information displayed on the user interface.

In some examples, a touchscreen of navigation system 114 is configured to display a two-dimensional overhead profile of the weather 110. The navigation system 114 may display the two-dimensional overhead profile based on the three-dimensional radar data stored in the memory. In some examples, the two-dimensional overhead profile of the weather 110 may indicate information corresponding to the weather 110. For example, the two-dimensional overhead profile may indicate a position of the aircraft and a position of the weather 110 from a perspective above the aircraft and the weather 110 looking at the ground. The touchscreen may also be configured to display a cross-section of weather data at a certain altitude requested by the user. For example, weather 110 may differ based on the altitude, and the user may want to view weather 110 at a certain altitude. Since the radar data stored in the memory is three-dimensional, the navigation system 114 may display a "slice" of the three-dimensional weather data corresponding to an altitude. The touchscreen of navigation system 114 may display weather 110 at an altitude requested by the user and/or display a top-down view of weather 110 from a perspective above weather 110 and aircraft 102.

In some examples, navigation system 114 may receive, via the touchscreen, a user selection of a region of weather 110 near the aircraft. Navigation system 114 may determine, based on three-dimensional radar data, additional information corresponding to the selected region of the weather. In some examples, the additional information comprises a maximum altitude of the selected region of the 110 weather. In some examples, the additional information comprises a maximum altitude of the selected region of the weather 110 corresponding to an above-threshold radar reflectivity.

Navigation system 114 may output, for display by the touchscreen, a two-dimensional overhead profile of the weather 110 overlaid with an indication of the additional information about the selected region. In some examples, the additional information comprises a maximum altitude of the selected region of the weather 110. In some examples the additional information comprises a maximum altitude of the selected region of the weather 110 corresponding to an above-threshold radar reflectivity. Navigation system 114 may receive, via the touch screen, information indicative of a user selection of a threshold radar reflectivity value. Based on receiving the user selection of the threshold radar reflectivity value, navigation system 114 may set the threshold radar reflectivity value. Navigation system 114 may determine the maximum altitude of the selected region of the weather 110 that is above the threshold radar reflectivity selected by the user. It is not required for navigation system 114 to set the threshold radar reflectivity based on a user selection. In some examples, the threshold radar reflectivity is pre-programmed. In some examples, navigation system 114 may set the threshold radar reflectivity based on one or more instructions received from a remote computing device.

Navigation system 114 may receive, from the touchscreen, an indication of a proposed flight path on the two-dimensional overhead profile displayed on the touchscreen. In some examples, the touchscreen may receive one or more touch inputs that define one or more vectors of the proposed flight path. In some examples, the one or more touch inputs to the touchscreen may represent fingers moving across the touchscreen. For example, the touch inputs may include "dragging" or "swiping" finger movements across the touchscreen that is displaying the two-dimensional overhead profile. Additionally, or alternatively, the one or more touch inputs may include touch inputs at single points on the two-dimensional overhead profile. Navigation system 114 display the proposed flight path on the touchscreen as the user makes the one or more touch inputs. Navigation system 114 may output, to the touchscreen, one or more buttons giving the user the opportunity to cancel or alter the proposed flight path. Additionally, or alternatively, navigation system 114 may output, to the touchscreen, an option to submit the proposed flight path while the proposed flight path is visible over the two-dimensional overhead profile. This allows the user to determine that the two-dimensional overhead profile is ready, and submit the two-dimensional overhead profile. When the proposed flight path is complete, navigation system 114 may determine the proposed flight path based on the one or more touch inputs to the touchscreen.

In some examples, the proposed flight path received via the touchscreen of navigation system 114 comprises one or more overhead flight vectors, wherein the one or more overhead vectors form one or more overhead angles. For example, a first overhead flight vector may form an angle with a second overhead flight vector. In some examples, each flight vector of the two or more overhead flight vectors represents a straight line over the two-dimensional overhead profile. Each angle of the one or more overhead angles may represent a proposed turn (e.g., pivot) in the proposed flight path. The proposed flight path described herein is not limited to straight flight vectors. In some examples, a proposed flight path may include one or more curved overhead flight segments. The proposed flight path may include only straight overhead vectors, a mix of straight overhead vectors and curved overhead flight segments, or only curved overhead flight segments. In any case, the proposed overhead flight path may include one or more segments that traverse the two-dimensional overhead profile from a first point to a second point. The first point, in some cases, may be a present location of the aircraft 102 on the two-dimensional overhead profile.

Navigation system 114 may determine, based on three-dimensional radar data stored in a memory of the navigation system 114 and the proposed flight path received via the touchscreen, a two-dimensional vertical side profile of the weather 110 along the proposed flight path. Since each section of the proposed flight path represents a path across the two-dimensional overhead profile, navigation system 114 may determine a vertical side profile corresponding to the proposed flight path. The vertical side profile may represent a vertical profile of the environment along the proposed flight path from a first location to a second location.

In some examples, to determine the two-dimensional vertical side profile, navigation system 114 is further configured to determine, based on the three-dimensional radar data and the two or more overhead flight vectors, one or more vertical side profiles including a vertical side profile corresponding to each section of the one or more sections of the flight path. Since the proposed flight path is overlaid on the two-dimensional overhead profile representing an overhead view of weather 110 from the top down, navigation system 114 may determine a vertical cross-section of the three-dimensional radar data corresponding to each section of the one or more sections of the flight path. In other words, the two-dimensional vertical side profile may include a full vertical profile along the proposed flight path such that the vertical side profile indicates the weather from the ground up to an altitude above the ground at every point along the proposed flight path. Navigation system 114 may combine the overhead vertical side profiles corresponding to the sections of the proposed flight path to create a single two-dimensional vertical side profile indicating weather along the proposed flight path.

Navigation system 114 may output the two-dimensional vertical side profile for display by the touchscreen. In some examples, navigation system 114 may output the two-dimensional vertical side profile in response to a user request to display the vertical side profile. In some examples, the navigation system 114 may output an option to select either a vertical profile or an overhead profile. When the user inputs a proposed flight path over the two-dimensional overhead profile, navigation system 114 may determine the two-dimensional vertical side profile corresponding to the proposed flight path. Navigation system 114 may output, to the touchscreen, an option to toggle between displaying the two-dimensional overhead profile including the proposed flight path and the two-dimensional vertical side profile corresponding to the proposed flight path.

Additionally, or alternatively, navigation system 114 may output, to the touchscreen an option to display an automatic mode and a manual mode for the two-dimensional overhead profile of the weather 110. In some examples, in the manual mode, navigation system 114 may represent a cross-sectional overhead view of the weather at the selected altitude level. For example, if the selected altitude level is 27,000 feet above sea level, navigating system 114 may generate a cross-sectional view at 27,000 feet based on the three-dimensional radar data stored in the memory of navigation system 114. In some examples, navigating system 114 may select a cross-section of the three-dimensional radar data corresponding to the selected altitude level, and display the cross-section on the touchscreen. In the automatic mode, navigation system 114 may display a top-down perspective overhead view of the weather 110. This perspective overhead view may show the "top" of weather 110 without showing a cross-sectional view that shows details of the interior of weather 110. It may be beneficial to output an option to toggle between the manual mode and the automatic mode so that the user can toggle between the overhead perspective view and a cross-sectional view at a selected altitude. This is because the cross-sectional view may, in some cases, omit important whether details. For example, if the selected altitude is set too high or too low, the cross-section may completely omit the existence of weather 110, but the overhead perspective view may still indicate the existence of weather 110.

Figure 2:
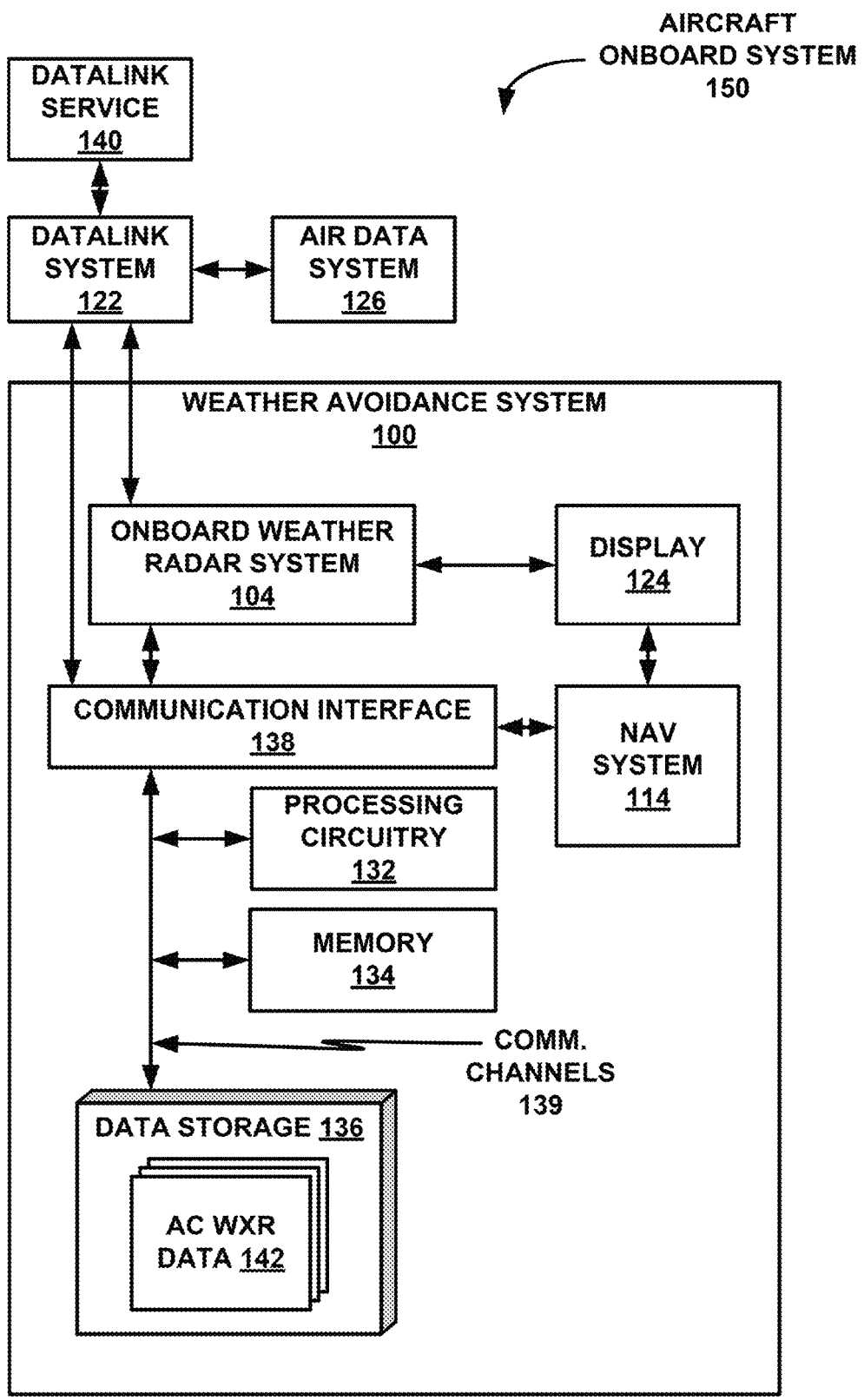
FIG. 2 depicts a block diagram of an aircraft onboard system, including an example weather avoidance system, in accordance with one or more techniques of this disclosure.

FIG. 2 depicts a block diagram of an aircraft onboard system 150, including an example weather-avoidance system 100, in accordance with one or more techniques of this disclosure. Weather-avoidance system 100 includes at least an onboard weather radar system 104 and a vehicle navigation system 114. In some examples, weather radar system 104 and navigation system 114 are two distinct entities in data communication with one another. In other examples, weather radar system 104 and navigation system 114 may be integrated into a single coherent unit (e.g., share common processing circuitry 132 and/or memory 134).

In some examples, weather avoidance system 100 includes a display 124, which may include or be a weather radar display system configured to render display of weather radar data from onboard weather radar system 104. Display 124 may also be configured to display other weather data from other weather data sensors or sources. Portions or all of aircraft onboard system 150 may be implemented in an integrated avionics system.

While weather radar system 104 is depicted separately from navigation system 114 and display 124 in FIG. 2, display 124 may be part of or integrated with either or both of onboard weather radar system 104 and navigation system 114 in various implementations. For example, in some implementations in which aircraft onboard system 150 is in an integrated architecture, weather avoidance system 100 may be implemented as a modular avionics unit configured to collect data from all available components of onboard system 150. In some examples in which aircraft onboard system 150 is implemented in an integrated architecture or a federated architecture, weather avoidance system 100 may be implemented as part of or co-located with weather data display system 124, which may already be configured to collect, process, and integrate data from several or all available weather data systems and sensors onboard aircraft 102. In other examples in which aircraft onboard system 150 is implemented in a federated architecture, onboard weather radar system 104 is a three-dimensional (3D) weather radar system, and display 124 does not have access to the full 3D scanning buffer memory of onboard weather radar system 104, weather avoidance system 100 may be implemented as part of or co-located with onboard weather radar system 104, to facilitate weather avoidance system 100 being configured to have access to the full 3D scanning buffer memory of onboard weather radar system 104. Onboard weather radar system 104 is also operatively coupled to datalink system 122, which may include radio transmission and reception equipment (e.g., a Ka band radio interface) configured to maintain broadband datalink communications with a datalink service.

As shown in FIG. 2, weather avoidance system 100 includes processing circuitry 132, one or more memory components 134 ("memory 134") (which may host in-memory data stores), one or more data storage devices 136 ("data storage 106") (e.g., hard disc drives or flash drives, which may host databases or schema-less data stores), and a communication interface (CI) 138 (e.g., including a network or bus connection), which is connected to one or more of the other components depicted in FIG. 2 and via datalink system 122 to datalink service 140. Weather avoidance system 100 is thus configured to communicate via datalink service 140.

In weather avoidance system 100, the processing circuitry 132, memory 134, data storage 136, and communication interface 138 are interconnected by communication channels 139, such as a bus or communication fabric, for transporting or communicating data and instruction code between processing circuitry 132, memory 134, data storage 136, and communication interface 138. Processing circuitry 132 may include one or more central processing units (CPUs), one or more CPU cores, one or more graphical processing units (GPUs), or any other type of processing units. Memory 134 may include any form of working memory, such as any form of random access memory (RAM). Data storage 136 may include any form of hard disc drives, redundant array of independent discs (RAID), Flash drives, cloud storage, or any other form of data storage, and may host any form of databases, schema-less data stores, or any type of data stores. Weather avoidance system 100 may process incoming data and outgoing data via communication interface 138, which may include interface subsystems for managing data communication with other systems and components of aircraft onboard system 150 including onboard weather radar system 104 and onboard electronic weather data display system 124, and via datalink system 122 with datalink service 140.

Datalink service 140 may include one or more datalink stations and one or more satellites. Satellites are configured to maintain radio broadband datalink connections with aircraft 102. Satellite and datalink stations are configured to maintain a radio broadband datalink connection with each other. Datalink service 140 may also include ground-based datalink stations that communicate directly with aircraft 102. Assets such as datalink stations and satellites may thus implement datalink service 140 to maintain broadband datalink connections among aircraft 102, and weather-avoidance system 100. Weather-avoidance system 100 may receive weather radar data from onboard weather radar system 104. Weather avoidance system 100 may at least temporarily store sets of aircraft weather radar data 142 from onboard weather radar system 104 within data storage 136.

Figure 3:
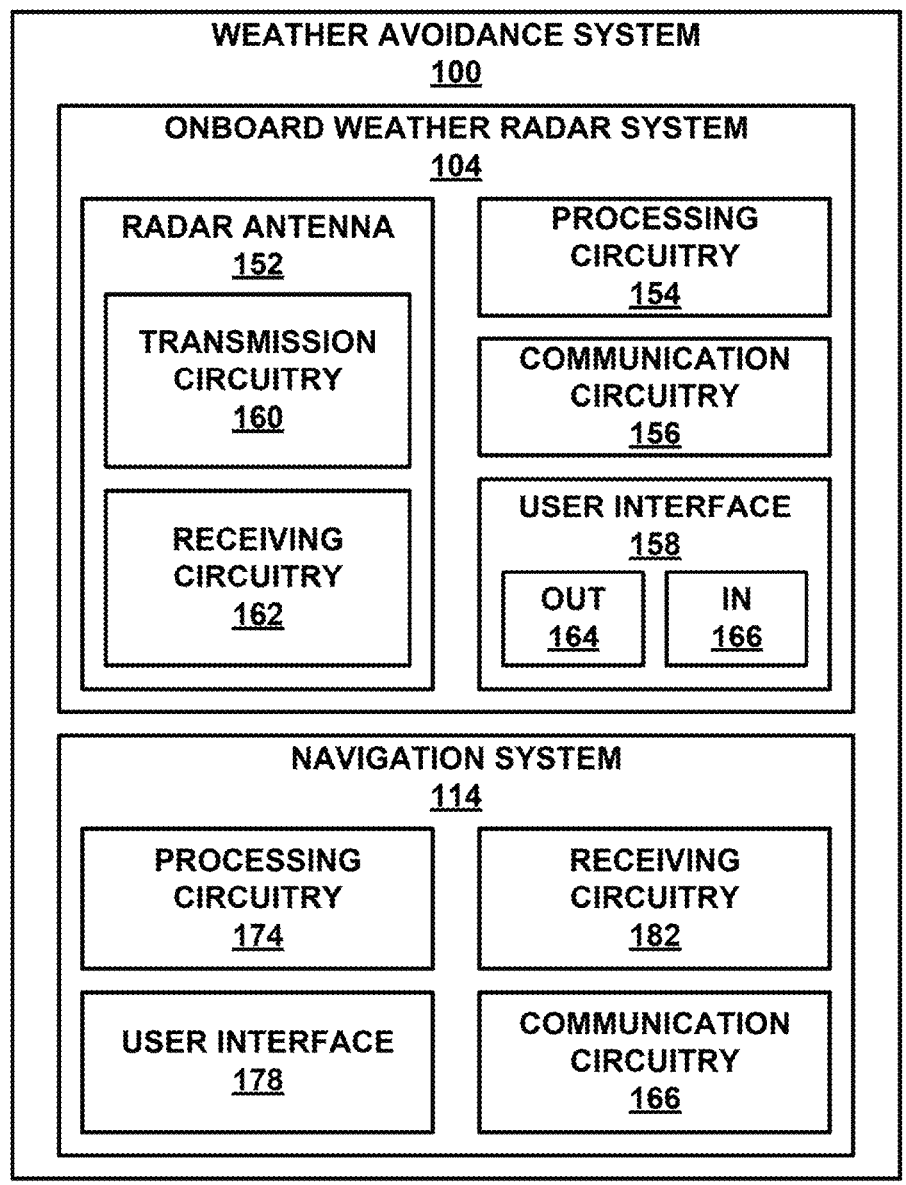
FIG. 3 is a block diagram depicting some example components of a weather avoidance system, in accordance with one or more techniques of this disclosure.

FIG. 3 is a block diagram depicting some example components of a weather avoidance system 100, in accordance with one or more techniques of this disclosure. Weather avoidance system 100 includes at least a weather radar system 104 and a vehicle navigation system 114. Onboard weather radar system 104 includes an antenna 152, processing circuitry 154, communication circuitry 156, and a user interface 158.

Radar antenna 152 may be installed near the front of a vehicle, such as within the nose of aircraft 102, and includes transmission circuitry 160 configured to transmit a transmitted radar signal 106 (FIG. 1). For example, transmission circuitry 160 may pass an electric current through a magnetron or some other device, causing emission of electromagnetic waves of a given wavelength.

Radar antenna 152 includes receiving circuitry 162 configured to receive a reflected radar signal 108 (FIG. 1). For example, receiving circuitry 162 may include a substance that, when struck by electromagnetic waves of reflected radar signal 108, generate a characteristic electric current indicative of the reflected radar signal 108, which may then be interpreted as data by processing circuitry 154.

Processing circuitry 154 may be an example of processing circuitry 132 of FIG. 2. Processing circuitry 154 may receive a signal (e.g., data) indicative of reflected radar signal 108, and process the signal so as to determine one or more objects (e.g., obstructions or other obstacles) in the vicinity that would have caused the transmitted radar signal 106 to be reflected. For example, processing circuitry 154 may determine, based on reflected radar signal 108, the presence of an obstacle (e.g., weather 110), in the flight path of aircraft 102.

In some examples, weather radar system 104 includes communication circuitry 156 in order to communicate with onboard navigation system 114. Navigation system 114 may include communication circuitry 166 configured to receive information. Both or either of communication circuitry 156, 166 may be examples of communication channels 139 and/or datalink system 122 of FIG. 2.

User interface 178 may include a display screen configured to output a graphical or textual indication, or a speaker configured to output an audio alert. User interface 178 may also include a user input mechanism configured to receive an indication of the user's input of the flight path. For example, user interface 178 may include a touchscreen, button, switch, or other manual input device.

In other examples, processing circuitry 174 may be configured to communicate the flight path alteration request, via communication circuitry 166, 156, to weather radar system 104. Radar system 104 may similarly be configured to display an indication of the flight path alteration request on radar system user interface 158, such that the request may be reviewed by a user, such as a pilot of aircraft 102, before the request is transmitted to traffic controller 120.

Radar system user interface 158 may be configured to display a graphical indication of potential obstacles in the vicinity of aircraft 102. For example, user interface 158 may include an output device 164, such as a display screen, configured to output a graphical indication of one or more obstacles detected by reflected radar signal 108. In some examples, user interfaces 158, 174 may be the same interface, and in some examples, either or both may be examples of communication interface 138 and/or display 124 of FIG. 2.

User input mechanism 166 may include a touchscreen, button, switch, or other manual input device through which a user may indicate approval or disapproval of the flight path alteration request.

Figure 4A:
FIG. 4A is a conceptual diagram illustrating a user interface of weather avoidance system of FIGS. 1-3, in accordance with one or more techniques of this disclosure.

FIG. 4A is a conceptual diagram illustrating a user interface 402 of weather avoidance system 100 of FIGS. 1-3, in accordance with one or more techniques of this disclosure. As seen in FIG. 4A, the user interface 402 includes a screen 410, a first button 412, a second button 414, a third button 416, a first knob, and a second knob 419. User interface 402 is not limited to having three buttons and two knobs. User interface 402 may include any number of buttons, knobs, or other user controls. In some examples, user interface 402 may be an example of display 124 of FIG. 2 and/or user interfaces 158, 178 of FIG. 3.

Screen 410 may include a touchscreen, but this is not required. Screen 410 may include any kind of screen that is capable of displaying a digital image. In the example of FIG. 4A, screen 410 displays a two-dimensional overhead profile of weather. In the example of FIG. 4A, the weather includes inclement weather 420. Screen 410 may display a location of aircraft 430 relative to a location of the inclement weather 420. In some examples, inclement weather 420 is an example of inclement weather 110 of FIG. 1. In some examples, aircraft 430 is an example of aircraft 102 of FIG. 1. The weather avoidance system may output the two-dimensional overhead profile for display on screen 410 based on radar data collected by an aircraft on which the weather avoidance system is located. In some examples, the two-dimensional overhead profile may include a top-down view of the inclement weather 420. In some examples, the two-dimensional overhead view may include a cross-sectional view of weather at a selected altitude.

The two-dimensional overhead profile may indicate a location of a section of inclement weather 420 relative to a location of aircraft 430. Inclement weather 420 may include a first section 422, a second section 424, a third section 426, and a fourth section 428. User interface 410 may display the first section 422, the second section 424, the third section 426, and the fourth section 428 to each have a different color, or a different amount of shading in order to differentiate between the sections. The weather avoidance system may determine the first section 422, the second section 424, the third section 426, and the fourth section 428 based on radar data.

In some examples, each section of sections 422, 424, 426, 428 may indicate a certain range of radar data values. For example, the radar data may indicate, for each location within weather 420, a highest altitude of reflection. The first section 422 may correspond to a first range of highest altitudes of reflection, the second section 424 may correspond to a second range of highest altitudes of reflection, the third section 426 may correspond to a third range of highest altitudes of reflection, and the fourth section 428 may correspond to a fourth range of highest altitudes of reflection. In some examples, the fourth range is the highest range, and the first range is the lowest range. In this example, the fourth section 428 may indicate a location of the highest maximum reflection altitude of the inclement weather 420. The example of FIG. 4A is not limited to displaying maximum reflection altitude data on screen 410. Screen 410 may display any kind of data relating to the inclement weather 420.

In some examples, the weather avoidance system 100 includes a volumetric buffer that stores radar data collected by the onboard weather radar system 104 located on aircraft 102. Weather avoidance system 100 may output weather information for display on screen 410 based on the radar data stored in the volumetric buffer. In some examples, weather avoidance system 100 might not display all the information stored in the volumetric buffer on the screen 410. But weather avoidance system 100 may, in some cases, display additional information on the screen 410 based on receiving one or more user requests to display additional information. For example, weather avoidance system 100 may receive, via screen 410, a user selection of one or more areas on the screen. Weather avoidance system 100 may identify additional information corresponding to the one or more selected areas, and output the information for display on the screen 410. In some examples, weather avoidance system 100 may determine key weather information of an area of interest to the user (e.g., pilot of the aircraft 102).

In some examples, a user may touch an area of the screen 410 to confirm whether there are any reflections below the displayed inclement weather 420. The weather avoidance system 100 may receive the user selection of the area of screen 100, and determine whether there are any radar reflections below the displayed inclement weather 420. The weather avoidance system 100 may output the information for display on the screen 420.

Weather avoidance system 100 may receive a user selection of one or more areas of screen 410. For example, weather avoidance system 100 may receive a user selection of the fourth section 428 of inclement weather 420. Weather avoidance system 100 may, in some cases, output a message for display by screen 410 to confirm that the user meant to select the fourth section 428. In response to receiving a confirmation via screen 410, weather avoidance system may determine additional information corresponding to the fourth section 428.

Figure 4B:
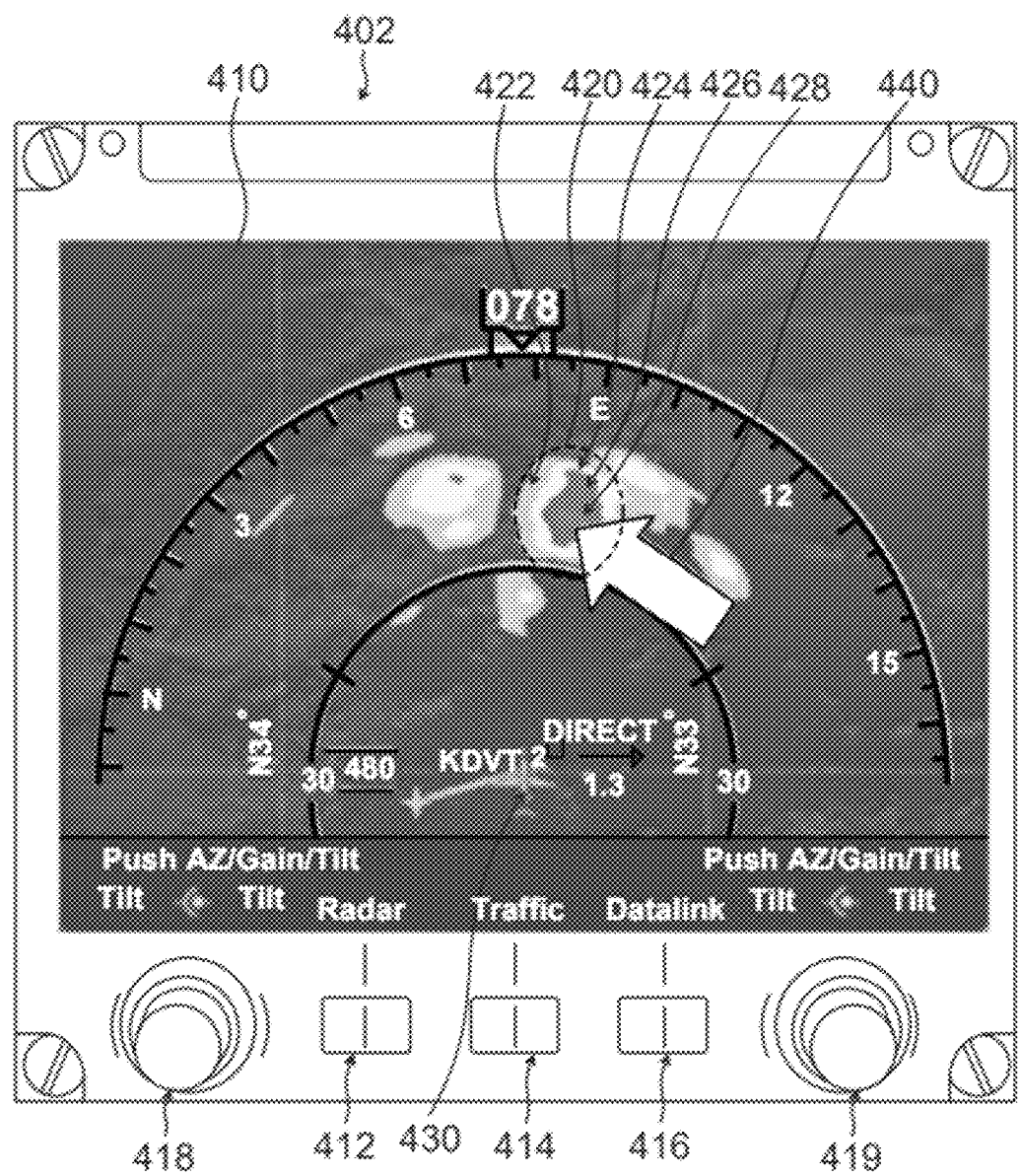
FIG. 4B is a conceptual diagram illustrating the user interface of FIG. 4A that includes a screen displaying a graphic that indicates an area of the screen, in accordance with one or more techniques of this disclosure.

FIG. 4B is a conceptual diagram illustrating the user interface 402 of FIG. 4A that includes a screen 410 displaying a graphic 440 that indicates an area of the screen 410, in accordance with one or more techniques of this disclosure. Weather avoidance system 100 may receive a user selection of one or more areas of screen 410. For example, weather avoidance system 100 may receive a user selection of the fourth section 428 of inclement weather 420. Weather avoidance system 100 may, in some cases, output a message for display by screen 410 to confirm that the user meant to select the fourth section 428. In response to receiving a confirmation via screen 410, weather avoidance system may determine additional information corresponding to the fourth section 428.

In some examples, the graphic 440 is an arrow that points at an area of the screen 410 selected by the user in order to confirm whether the user selected the respective area. As seen in FIG. 4B, graphic 440 is an arrow that is pointing at the fourth section 428 of inclement weather 420, indicating a user selection of the fourth section 428. In some examples, the weather avoidance system 100 may receive a confirmation that the graphic 440 is pointing at the correct area, and proceed to determine additional information corresponding to the fourth section 428 based on receiving the confirmation.

Figure 4C:
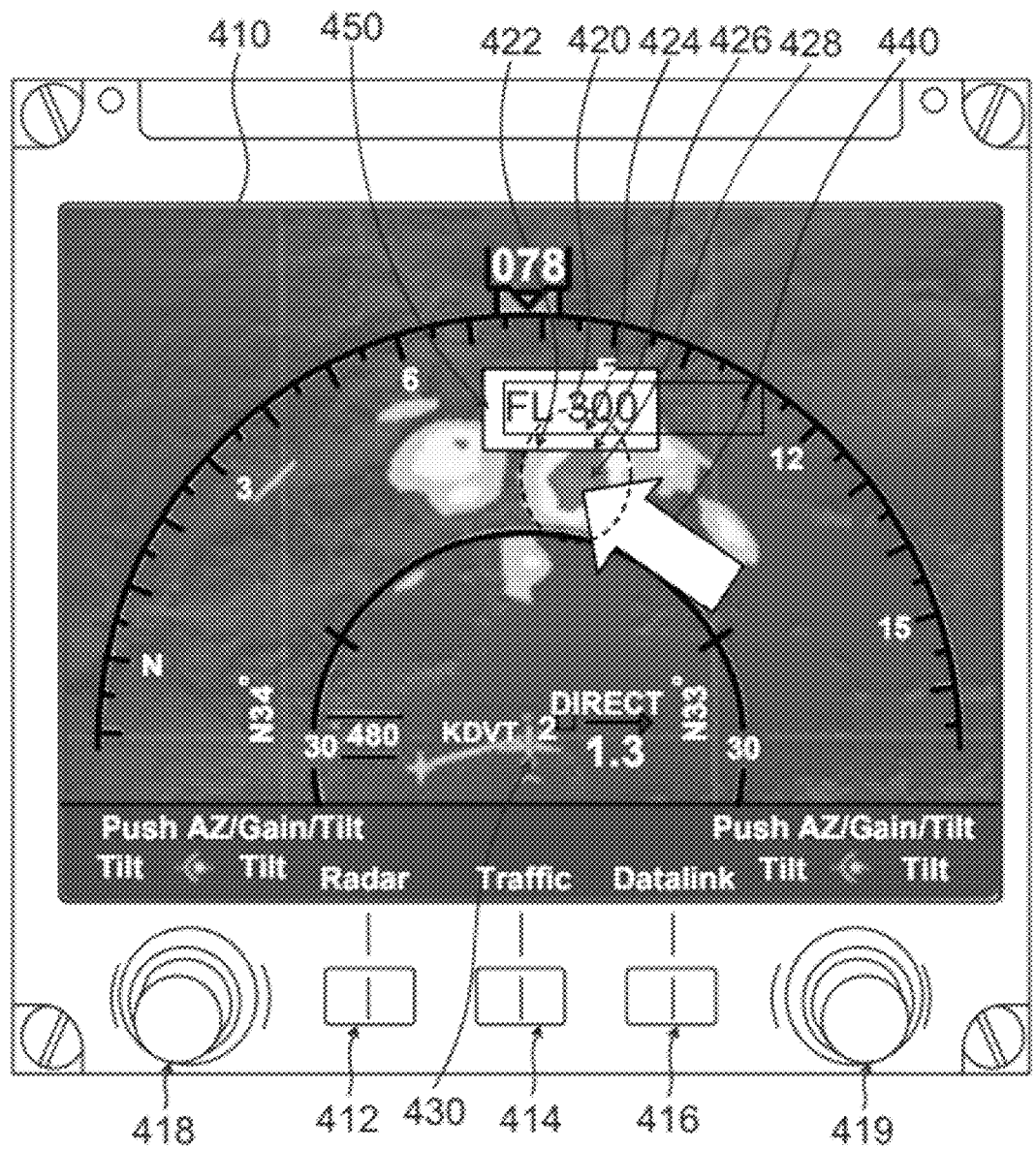
FIG. 4C is a conceptual diagram illustrating the user interface of FIG. 4A that includes a screen displaying a graphic that indicates an area of the screen and additional information corresponding to the area of the screen, in accordance with one or more techniques of this disclosure.

FIG. 4C is a conceptual diagram illustrating the user interface 402 of FIG. 4A that includes a screen 410 displaying a graphic 440 that indicates an area of the screen 410 and additional information 450 corresponding to the area of the screen 410, in accordance with one or more techniques of this disclosure.

Additional information 450 may represent weather information corresponding to the fourth section 428 of the inclement weather 420 selected by the user. For example, additional information 450 may include a highest detected reflection for the fourth section 428 of the inclement weather 420. As described herein, "detected reflection" may represent a radar data parameter that represents a proportion of an emitted radar signal 106 that is reflected back to the aircraft 102. The highest detected reflection for the fourth section 428 of the inclement weather 420 may represent the greatest detected reflection for any point within the fourth section 428 of the inclement weather.

The additional information 450 displayed by the screen 410 is not limited to the highest detected reflection of the fourth section 428. The additional information 450 may include any weather information related to any area selected by the user. For example, the additional information 450 may include a highest altitude of the selected area with any level of radar reflection. For example, the highest altitude of the fourth section 428 with any radar reflection may represent the highest altitude of inclement weather 420. This may provide pilots of the aircraft 430 with information for hopping over the inclement weather 420 by flying above the weather. In some examples, the additional information 450 may include a highest altitude of the selected area that has a detected reflection above a threshold detected reflection.

Figure 5A:
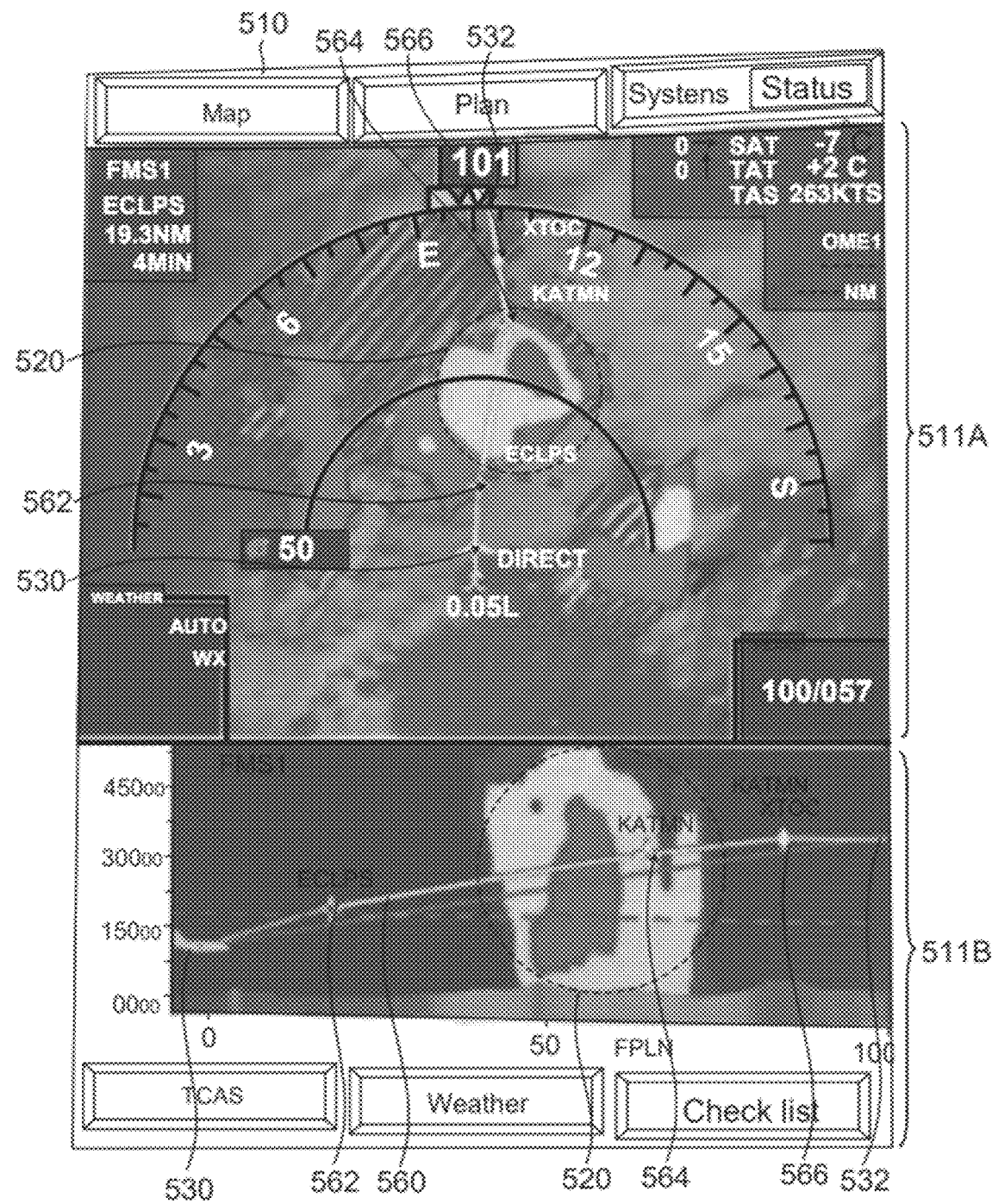
FIG. 5A is a conceptual diagram illustrating an example user interface screen including a first screen portion displaying a two-dimensional overhead profile of radar data showing a proposed flight path, and a second screen portion displaying a two-dimensional vertical side profile of radar data corresponding to the proposed flight path, in accordance with one or more techniques of this disclosure.

FIG. 5A is a conceptual diagram illustrating an example user interface screen 510 including a first screen portion 511A displaying a two-dimensional overhead profile of radar data showing a proposed flight path 560, and a second screen portion 511B displaying a two-dimensional vertical side profile of radar data corresponding to the proposed flight path 560, in accordance with one or more techniques of this disclosure. As seen in FIG. 5A, the user interface screen 510 displays a planned flight path 560 over both of the two-dimensional vertical side profile of the inclement weather 520 on the first screen portion 511A and the two-dimensional vertical side profile of the inclement weather 520 on the second screen portion 511B.

The planned flight path 560 extends from a current location of aircraft 530 through the inclement weather 520 to a screen endpoint 532. In some examples, flight path 560 extends beyond the end of the screen 510. The planned flight path 560 includes a first turn 562, a second turn 564, and a third turn 566. As described herein, a "turn" may represent a pivot relative to the ground and/or a pivot in the angle of ascent or descent. For example, as seen on the two-dimensional vertical side profile at first turn 562, the aircraft 530 decreases the angle of ascent. Furthermore, as seen on the two-dimensional overhead profile at first turn 562, the aircraft 530 pivots to the right relative to the ground.

In some examples, weather avoidance system 100 may generate the two-dimensional overhead profile of inclement weather 520 and aircraft 530 for display by the first screen portion 511A based on radar data stored in a memory of weather avoidance system 100. For example, the radar data stored in the memory of weather avoidance system 100 may include three-dimensional radar data. The three-dimensional radar data may include a reflection level corresponding to each point within a three-dimensional space. In some examples, radar reflection levels may be higher in areas of inclement weather such as weather 520. In some examples, radar reflection levels may be very low or nonexistent in areas of clear weather. Since the weather data is three-dimensional, weather avoidance system 100 may generate both a top-down overhead view of inclement weather 520 and a side view of the inclement weather 520 based on the same pool of data.

As described herein, a "top-down overhead view" refers to a view of weather from a position above the ground looking towards the ground. In some examples, a "vertical side profile" refers to a view from a position to the side of the weather looking towards the weather. The vertical side profile may extend from the ground to a point above the ground so that the profile shows the weather at different altitudes.

In some examples, weather avoidance system 100 may generate the vertical side profile corresponding to the planned flight path 560 based on the three-dimensional radar data stored in the memory and the overhead view of the planned flight path 560. For example, weather avoidance system 100 may identify one or more vertical slices of weather data based on vectors of the overhead view of the planned flight path 560 displayed by first portion 511A of screen 510. For example, weather avoidance system 100 may overlay a first vector between the current location of aircraft 530 and first turn 562, a second vector between first turn 562 and second turn 564, a third vector between second turn 564 and third turn 566, and a fourth vector between third turn 566 and point 532. Weather avoidance system 100 may identify a horizontal slice corresponding to each of the first vector, the second vector, the third vector, and the fourth vector and combine these horizontal slices to generate the vertical side profile displayed by second section 511B of screen 510.

Figure 5B:
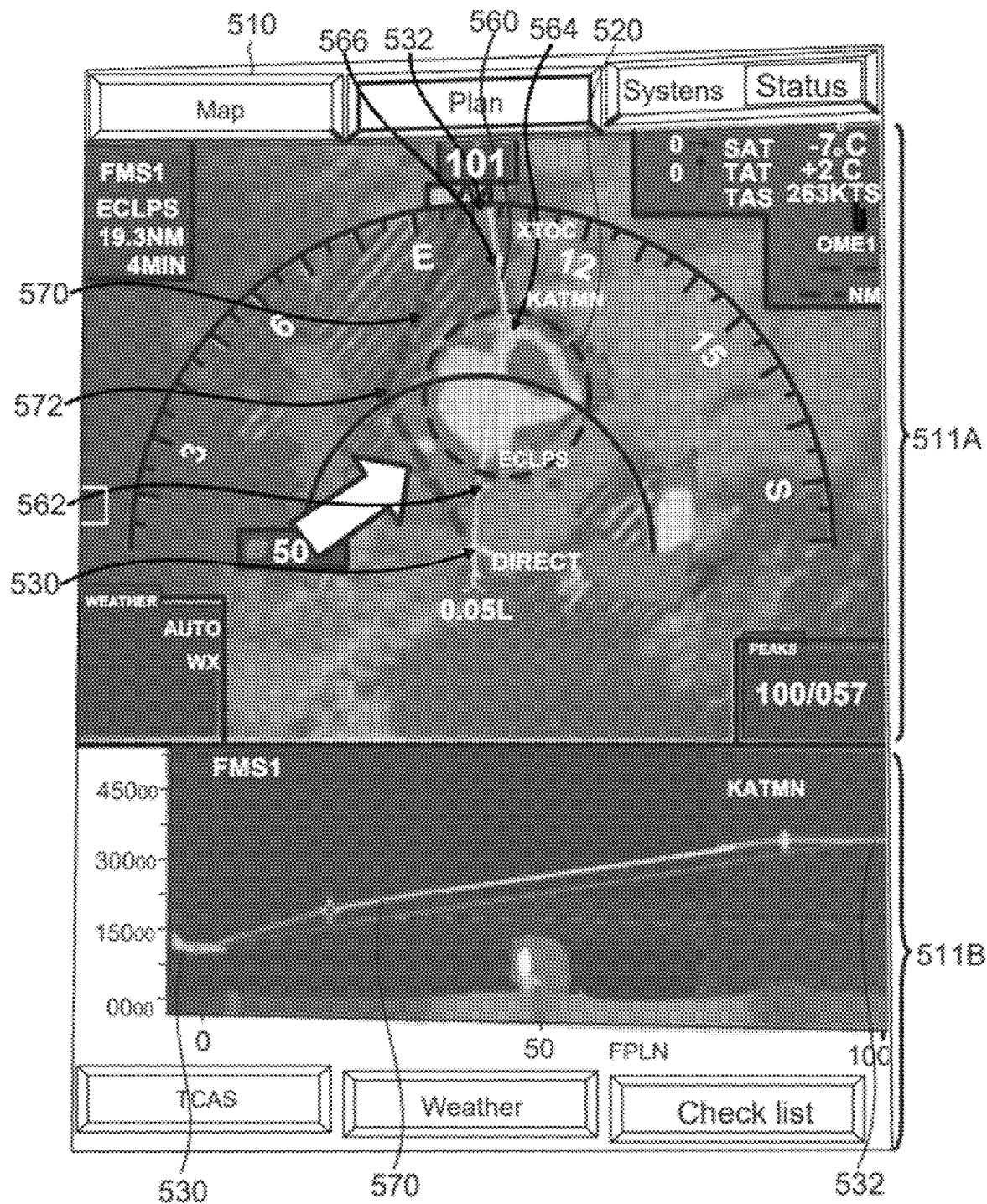
FIG. 5B is a conceptual diagram illustrating an example user interface screen including a first screen portion displaying a two-dimensional overhead profile of radar data showing a proposed flight path and an alternative flight path, and a second screen portion displaying a two-dimensional vertical side profile of weather data corresponding to the alternative flight path, in accordance with one or more techniques of this disclosure.

FIG. 5B is a conceptual diagram illustrating an example user interface screen 510 including a first screen portion 511A displaying a two-dimensional overhead profile of radar data showing a proposed flight path 560 and an alternative flight path 570, and a second screen portion 511B displaying a two-dimensional vertical side profile of weather data corresponding to the alternative flight path 570, in accordance with one or more techniques of this disclosure. In some examples, alternative flight path 570 may represent a flight path input to screen 510 as an alternative to proposed flight path 560. As seen in FIG. 5B, alternative flight path 570 routes aircraft 530 on a flight path that does not fly through inclement weather 520.

In some examples, the alternative flight path 570 illustrated in the second screen portion includes one or more vertical flight vectors. Each vertical flight vector of the one or more vertical flight vectors represents a segment of the alternative flight path 570 through the two-dimensional vertical side profile. Processing circuitry may determine the one or more vertical flight vectors corresponding to the alternative flight path 570 through the two-dimensional overhead profile. The processing circuitry may output the one or more vertical flight vectors corresponding to the alternative flight path 570 for display over the two-dimensional vertical side profile on the second screen portion 511B.

In some examples, screen 510 is part of a weather avoidance system 100 onboard aircraft 530. Screen 510 may represent a touchscreen. Screen 510 may receive one or more touch inputs to the first portion 511A that draw the alternative flight path 570. For example, a user may draw their finger over the first portion 511A of the screen 510 to create the alternative flightpath 570 so that the alternative flight path 570 avoids the inclement weather 520.

The second portion 511B displays a vertical side profile view that shows one or more vertical slices of data from the three-dimensional radar data stored in the memory. By allowing the user to input flight paths, the screen 510 provides the user an easy way of analyzing different candidate flight paths. The user may enter a flight path by sliding a finger or by touching different graphical waypoints. Then the weather avoidance system 100 may generate a vertical profile view for the alternative flight path, giving the radar data corresponding to the alternative flight path.

Figure 6B:
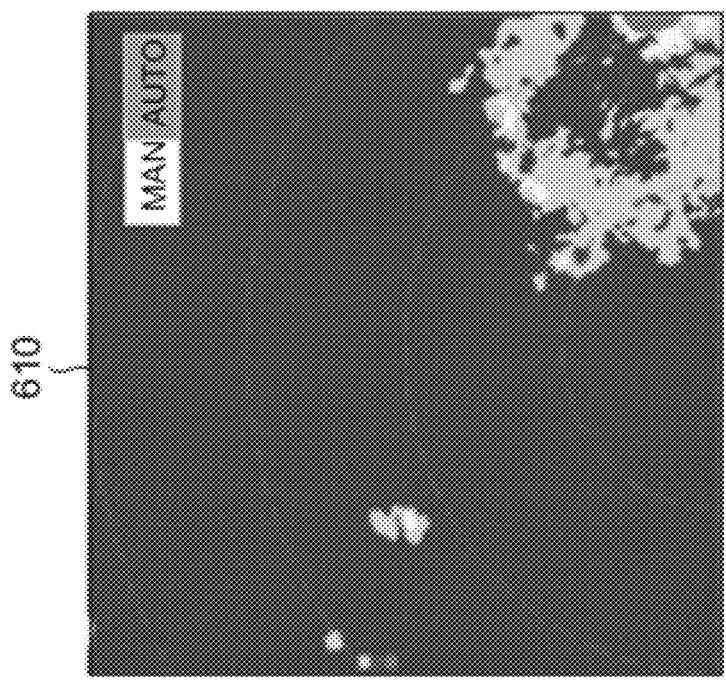
FIGS. 6A and 6B are conceptual diagrams illustrating an automatic mode and a manual mode for displaying an overhead view of weather data, in accordance with one or more techniques of this disclosure. In some examples, a screen may display weather data corresponding to an area proximate to an aircraft and/or an area through which the aircraft is expected to fly.
Figure 6A:
Figure 6A:
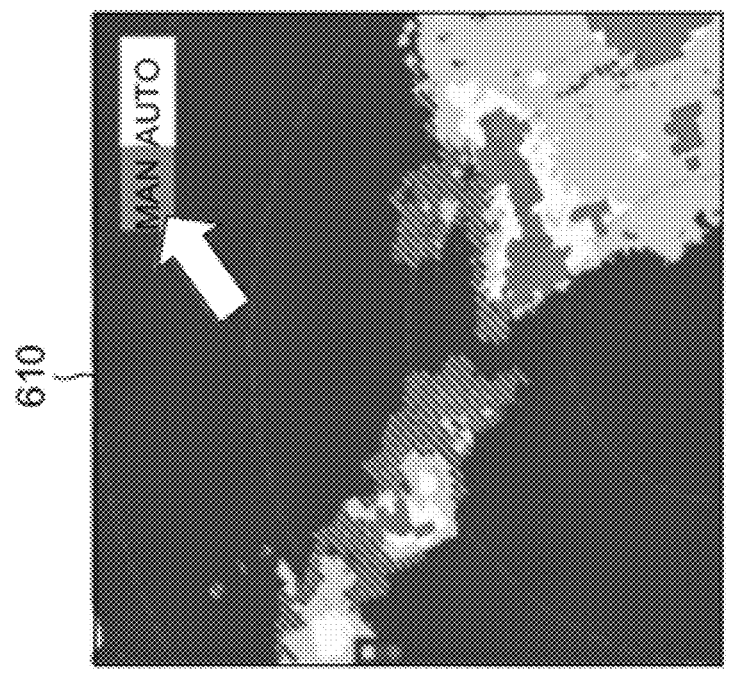

FIGS. 6A and 6B are conceptual diagrams illustrating an automatic mode and a manual mode for displaying an overhead view of weather data, in accordance with one or more techniques of this disclosure. In some examples, a screen 610 may display weather data corresponding to an area proximate to an aircraft and/or an area through which the aircraft is expected to fly. In the automatic mode of FIG. 6A, the weather may include a bird's eye view of the weather, from a perspective above the aircraft looking towards the ground. In the manual mode, the screen 610 may display a slice of weather data at a selected altitude (e.g., 25,000 feet).

It may be beneficial for a flight crew to keep one display in automatic mode and another display in a manual flight level mode. This way, flight crew can compare differences between the automatic mode and the manual mode. Screen 610 may toggle between manual mode and automatic mode. This feature is also beneficial in an aircraft flown by a signal pilot. In this example, the pilot uses the touch screen 610 to toggle from automatic mode to manual mode. Manual mode can be set to any altitude level. In some examples, a user may select an altitude for the manual mode. Once in manual mode, the pilot could toggle back to automatic mode by touching 'Auto' on the display.

Figure 7:
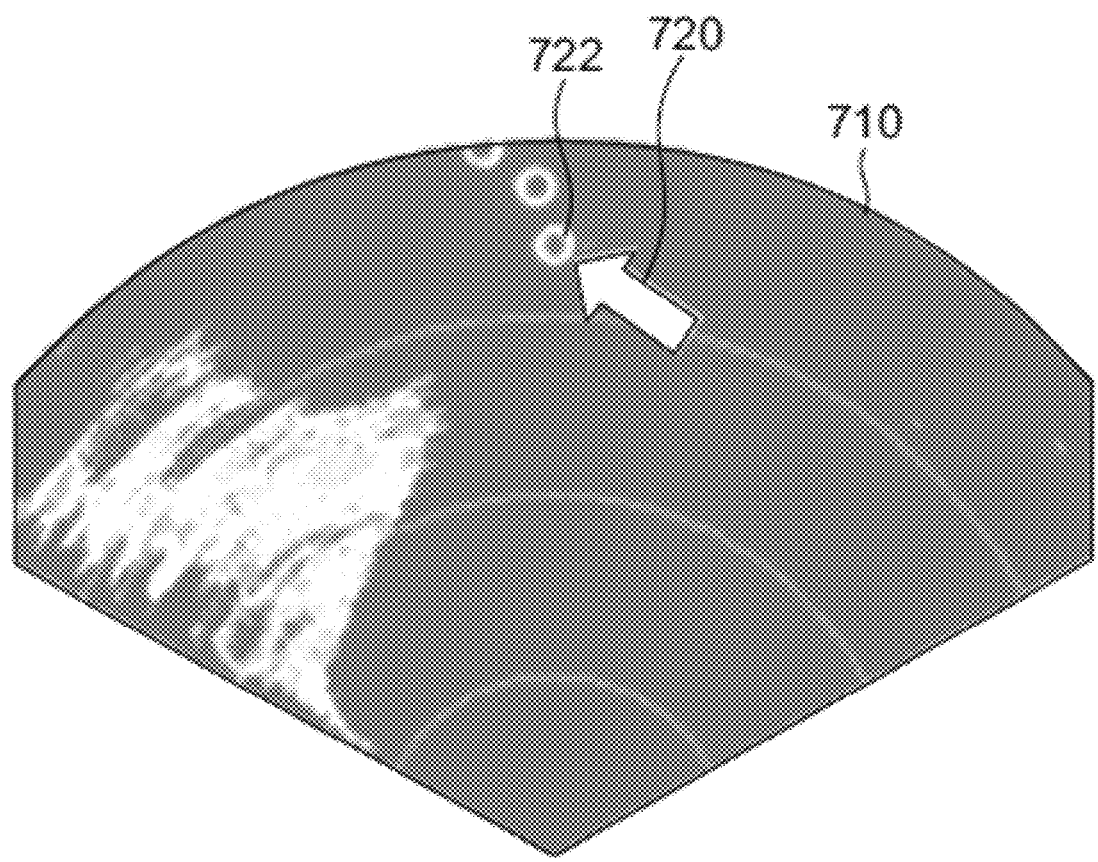
FIG. 7 is a conceptual diagram indicating a screen displaying one or more offshore locations, in accordance with one or more techniques of this disclosure.

FIG. 7 is a conceptual diagram indicating a screen 710 displaying one or more offshore locations, in accordance with one or more techniques of this disclosure. For example, screen 710 may display offshore location 722. Rotary aircraft (e.g., helicopters) may be used for flights to offshore locations, such as oil rigs. The offshore locations may have onboard devices that that highlight their location on a screen 710 of the aircraft. As seen in FIG. 7, offshore location 722 is visible on screen 710. When screen 710 is a touch screen, a user may select a target such as offshore location 722, and then the screen 710 may display the information related to the selected target. In some examples, the information may include a unique identifier. Screen 710 may also include a graphic 720 that indicates the selected target.

Figure 8A:
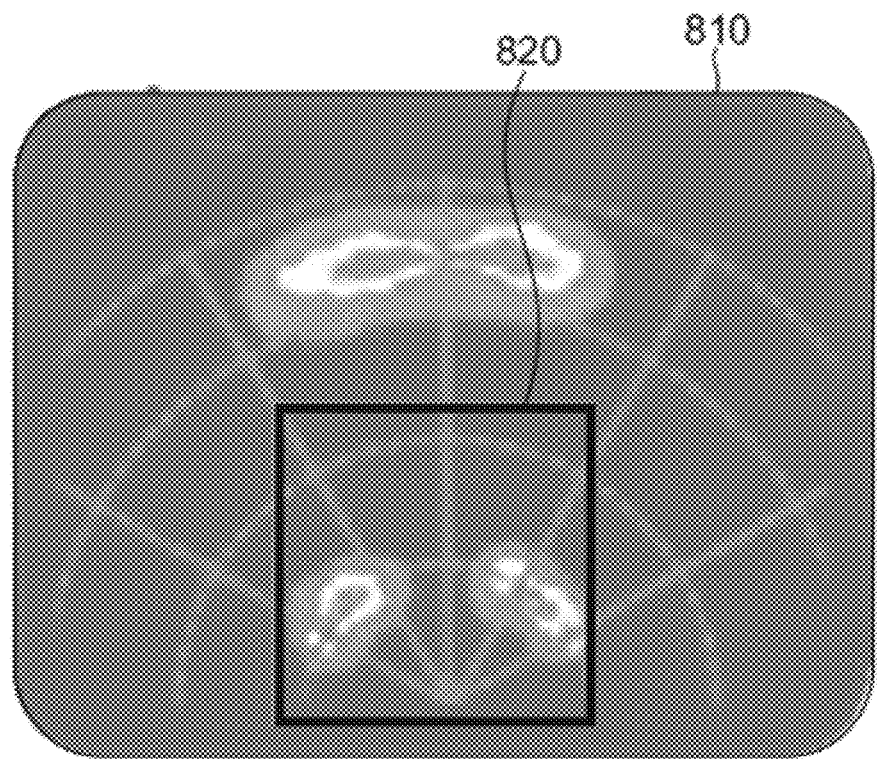
FIGS. 8A and 8B are conceptual diagrams illustrating a screen displaying weather data, in accordance with one or more techniques of this disclosure.
Figure 8B:
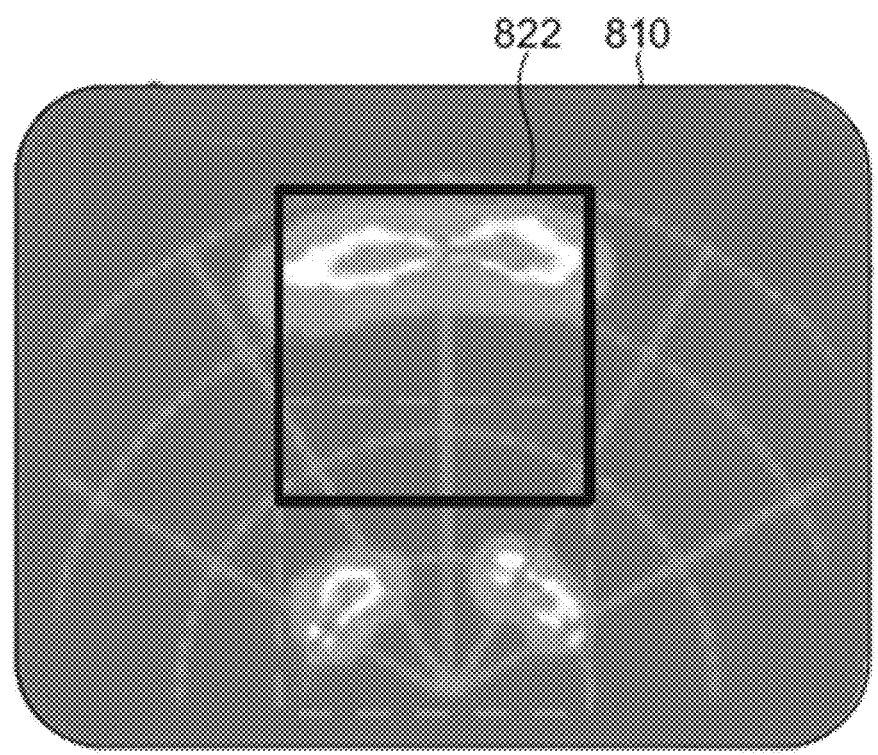

FIGS. 8A and 8B are conceptual diagrams illustrating a screen 810 displaying weather data, in accordance with one or more techniques of this disclosure. In the example of FIG. 8A, the screen 820 may display data within box 820 in response to user input. In the example of FIG. 8B, the screen 822 may display weather data in response to user input.

A memory may store three-dimensional radar data that includes more data than is typically displayed. When a user wants to view weather data that is further out than the current range, the screen 810 allows the user to input a touch gesture that allows the user to see beyond the selected range without needing to adjust the range. The touch input to the screen 810 may include a 'pull' gesture that reveals that is beyond the current range. When the finger leaves the screen 810, the display may 'snap back' to a previous position. The user may select a range that causes screen 810 to shows what is in the white box 820. The user may take a quick look to see what is beyond the selected display range. The pilot may use a touch gesture to pull' data onto the screen 810.

When the screen 810 receives the pull gesture, the range remains the same, but the data in the solid white box 820 is shown. When the user releases the gesture, the display snaps back to where it was before. There are several other controls that a screen could allow. For example, the controllers may have a knob to select an altitude slice. A simple touch gesture could also be implemented to select the altitude slice. Similarly, range could also be selected using well-known touch screen gestures. Other controls that are implemented on the control panels can also be replicated with the touch screen.

Figure 9:
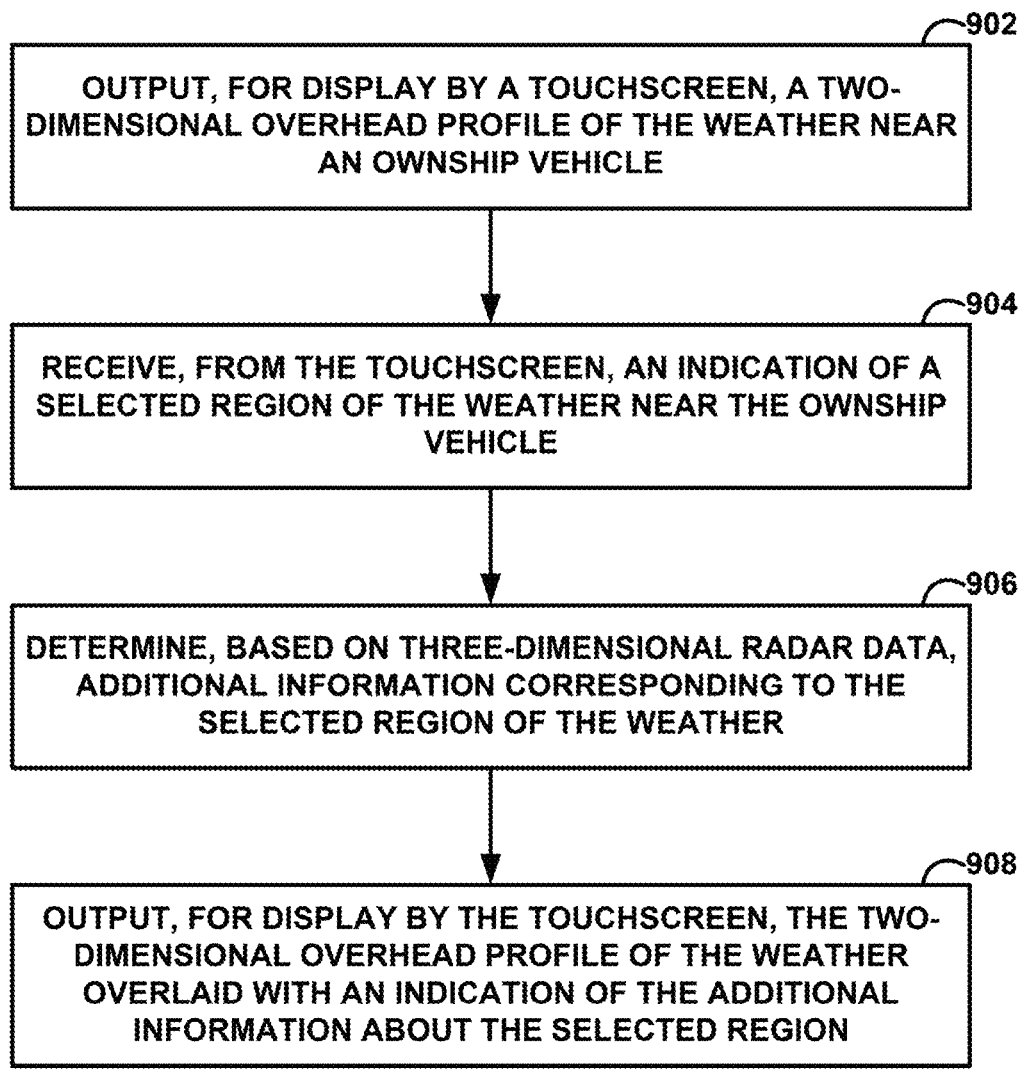
FIG. 9 is a flow diagram illustrating an example operation for outputting information corresponding to a selected region, in accordance with one or more techniques of this disclosure.

FIG. 9 is a flow diagram illustrating an example operation for outputting information corresponding to a selected region, in accordance with one or more techniques of this disclosure. For convenience, FIG. 9 is described with respect to weather avoidance system 100 of FIGS. 1-3. However, the techniques of FIG. 9 may be performed by different components of weather avoidance system 100 or by additional or alternative devices.

Weather avoidance system 100 may output, for display by a touchscreen, a two-dimensional overhead profile of inclement weather 110 near an aircraft 102 (902). In some examples, the two-dimensional overhead profile may include radar data that indicates one or more reflectivity parameters indicative of inclement weather. Weather avoidance system 100 may receive, from the touchscreen, and indication of a selected region of the inclement weather 110 near the aircraft 102 (904). In some examples, the indication is a touch input at the selected area. Weather avoidance system 100 may determine, based on three-dimensional radar data stored in a memory, additional information corresponding to the selected region (906). In some examples, additional information may include one or more reflectivity parameters. Weather avoidance system 100 may output, for display by the touchscreen, the two-dimensional overhead profile of the weather 110 overlaid with an indication of the additional information about the selected region (908).

In one or more examples, the circuitry described herein may utilize hardware, software, firmware, or any combination thereof for achieving the functions described. Those functions implemented in software may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure.

Instructions may be executed by one or more processors. The one or more processors may, for example, include one or more DSPs, general purpose microprocessors, application specific integrated circuits ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for performing the techniques described herein. Also, the techniques could be fully implemented in one or more circuits or logic elements.

The techniques of this disclosure may be implemented in a wide variety of devices or apparatuses that include integrated circuits (ICs) or sets of ICs (e.g., chip sets). Various components, modules, or units are described in this disclosure to emphasize functional aspects of devices configured to perform the disclosed techniques, but do not necessarily require realization by different hardware units. Rather, various units may be combined or provided by a collection of interoperative hardware units, including one or more processors as described above, in conjunction with suitable software and/or firmware.

Various illustrative aspects of the disclosure are described above. These and other aspects are within the scope of the following claims.

What is claimed is:

1. A computing system configured to mount on an ownship vehicle, the computing system comprising:
   a memory configured to store three-dimensional radar data indicating weather proximate to the ownship vehicle;
   a touchscreen; and
   processing circuitry configured to:
      output, for display by the touchscreen, a two-dimensional overhead profile of the weather proximate to the ownship vehicle;
      receive, from the touchscreen, an indication of a selected region of the weather proximate to the ownship vehicle;
      determine, based on the three-dimensional radar data, additional information corresponding to the selected region of the weather;
      output, for display by the touchscreen, the two-dimensional overhead profile of the weather overlaid with an indication of the additional information about the selected region;
      receive, from the touchscreen, a selection of a proposed flight path;
      determine, based on the three-dimensional radar data and the proposed flight path, a two-dimensional vertical side profile of the weather along the proposed flight path; and
      output an indication of the proposed flight path over the two-dimensional vertical side profile of the weather for display by the touchscreen.

2. The computing system of claim 1, wherein the additional information comprises a maximum altitude of the selected region of the weather.

3. The computing system of claim 1, wherein the additional information comprises a maximum altitude of the selected region of the weather corresponding to an above-threshold radar reflectivity.

4. The computing system of claim 1, wherein the proposed flight path comprises two or more overhead flight vectors, wherein the two or more overhead flight vectors form one or more overhead angles, and
   wherein to determine the two-dimensional vertical side profile of the weather, the processing circuitry is further configured to:
      determine, based on the three-dimensional radar data and the two or more overhead flight vectors, two or more vertical side profiles including a vertical side profile corresponding to each overhead flight vector of the two or more overhead flight vectors; and combine the two or more overhead vertical side profiles to create the two-dimensional vertical side profile of the weather along the proposed flight path.

5. The computing system of claim 4,
wherein the processing circuitry is further configured to determine one or more vertical flight vectors corresponding to the proposed flight path on the two-dimensional overhead profile; and
wherein to output the indication of the proposed flight path over the two-dimensional vertical side profile for display by the touchscreen, the processing circuitry is further configured to output the one or more vertical flight vectors corresponding to the proposed flight path for display over the two-dimensional vertical side profile.

6. The computing system of claim 1, wherein the processing circuitry is further configured to:
receive, from the touchscreen, an actuation of a manual-mode setting and a selected altitude level; and
determine, based on the three-dimensional radar data, a two-dimensional cross-sectional overhead view of the weather at the selected altitude level; and
output the two-dimensional cross-sectional overhead view for display by the touchscreen.

7. The computing system of claim 6, wherein the processing circuitry is further configured to:
receive, from the touchscreen, an actuation of an automatic-mode setting; and
determine, based on the three-dimensional radar data, a two-dimensional perspective overhead view of the weather; and
output the two-dimensional perspective overhead view for display by the touchscreen.

8. The computing system of claim 1, wherein the processing circuitry is further configured to:
receive, via radar-frequency transmission, and store, handshake data from a destination facility;
output, for display by the touchscreen, an indication of the destination facility;
receive, from the touchscreen, a selection of the indication of the destination facility; and
output, for display by the touchscreen, additional information about the destination facility from the handshake data.

9. The computing system of claim 1, wherein the processing circuitry is further configured to:
receive, from the touchscreen, user input dragging a view screen from a first location surrounding the ownship vehicle to a second location away from the ownship vehicle;
output, for display by the touchscreen, a two-dimensional overhead profile of the weather corresponding to the second location;
determine that the user has released the view screen; and
automatically return the view screen from the second location back to the first location surrounding the ownship vehicle.

10. A method comprising:
outputting, by processing circuitry for display by a touchscreen, a two-dimensional overhead profile of weather proximate to an ownship vehicle;
receiving, by the processing circuitry from the touchscreen, an indication of a selected region of the weather proximate to the ownship vehicle;
determining, by the processing circuitry based on three-dimensional radar data stored in a memory, additional information corresponding to the selected region of the weather, the three-dimensional radar data indicating weather proximate to the ownship vehicle;
outputting, by the processing circuitry for display by the touchscreen, the two-dimensional overhead profile of the weather overlaid with an indication of the additional information about the selected region;
receiving, from the touchscreen, a selection of a proposed flight path;
determining, based on the three-dimensional radar data and the proposed flight path, a two-dimensional vertical side profile of the weather along the proposed flight path; and
outputting an indication of the proposed flight path over the two-dimensional vertical side profile of the weather for display by the touchscreen.

11. The method of claim 10, wherein the additional information comprises a maximum altitude of the selected region of the weather.

12. The method of claim 10, wherein the proposed flight path comprises two or more overhead flight vectors, wherein the two or more overhead flight vectors form one or more overhead angles, and
wherein determining the two-dimensional vertical side profile comprises:
determining, by the processing circuitry based on the three-dimensional radar data and the two or more overhead flight vectors, two or more vertical side profiles including a vertical side profile corresponding to each overhead flight vector of the two or more overhead flight vectors; and
combining, by the processing circuitry, the two or more overhead vertical side profiles to create the two-dimensional vertical side profile of the weather along the proposed flight path.

13. The method of claim 12, further comprising:
determining, by the processing circuitry, one or more vertical flight vectors corresponding to the proposed flight path on the two-dimensional overhead profile; and
outputting the indication of the proposed flight path over the two-dimensional vertical side profile comprises outputting, by the processing circuitry, the one or more vertical flight vectors corresponding to the proposed flight path for display over the two-dimensional vertical side profile.

14. The method of claim 10, further comprising:
receiving, by the processing circuitry from the touchscreen, an actuation of a manual-mode setting and a selected altitude level; and
determining, by the processing circuitry based on the three-dimensional radar data, a two-dimensional cross-sectional overhead view of the weather at the selected altitude level; and
outputting, by the processing circuitry, the two-dimensional cross-sectional overhead view for display by the touchscreen.

15. The method of claim 14, further comprising:
receiving, by the processing circuitry from the touchscreen, an actuation of an automatic-mode setting; and
determining, by the processing circuitry based on the three-dimensional radar data, a two-dimensional perspective overhead view of the weather; and
outputting, by the processing circuitry, the two-dimensional perspective overhead view for display by the touchscreen.

16. The method of claim 10, further comprising:
receiving, by the processing circuitry via radar-frequency transmission, and storing, by the processing circuitry, handshake data from a destination facility;
outputting, by the processing circuitry for display by the touchscreen, an indication of the destination facility;
receiving, by the processing circuitry from the touchscreen, a selection of the indication of the destination facility; and
outputting, by the processing circuitry for display by the touchscreen, additional information about the destination facility from the handshake data.

17. The method of claim 10, further comprising:
receiving, by the processing circuitry from the touchscreen, user input dragging a view screen from a first location surrounding the ownship vehicle to a second location away from the ownship vehicle;
outputting, by the processing circuitry for display by the touchscreen, a two-dimensional overhead profile of the weather corresponding to the second location;
determining, by the processing circuitry, that the user has released the view screen; and
automatically returning, by the processing circuitry, the view screen from the second location back to the first location surrounding the ownship vehicle.

18. A non-transitory computer-readable medium comprising instructions for causing one or more processors to:
output, for display by a touchscreen, a two-dimensional overhead profile of weather proximate to an ownship vehicle;
receive, from the touchscreen, an indication of a selected region of the weather proximate to the ownship vehicle;
determine, based on three-dimensional radar data stored in a memory, additional information corresponding to the selected region of the weather, the three-dimensional radar data indicating weather proximate to the ownship vehicle;
output, for display by the touchscreen, the two-dimensional overhead profile of the weather overlaid with an indication of the additional information about the selected region;
receive, from the touchscreen, a selection of a proposed flight path;
determine, based on the three-dimensional radar data and the proposed flight path, a two-dimensional vertical side profile of the weather along the proposed flight path; and
output an indication of the proposed flight path over the two-dimensional vertical side profile of the weather for display by the touchscreen.

\* \* \* \* \*